United States Patent
Johnson

(10) Patent No.: US 10,498,561 B2
(45) Date of Patent: Dec. 3, 2019

(54) ADAPTIVE EQUALIZATION CHANNEL EXTENSION RETIMER LINK-UP METHODOLOGY

(71) Applicant: Intel Corporation, Santa Clara, CA (US)

(72) Inventor: Samuel A. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/749,352

(22) PCT Filed: Aug. 6, 2016

(86) PCT No.: PCT/US2016/045925
§ 371 (c)(1),
(2) Date: Jan. 31, 2018

(87) PCT Pub. No.: WO2017/024290
PCT Pub. Date: Feb. 9, 2017

(65) Prior Publication Data
US 2018/0227149 A1    Aug. 9, 2018

Related U.S. Application Data

(60) Provisional application No. 62/202,078, filed on Aug. 6, 2015.

(51) Int. Cl.
*H04L 25/03* (2006.01)
*H04L 12/861* (2013.01)

(52) U.S. Cl.
CPC .. *H04L 25/03019* (2013.01); *H04L 25/03114* (2013.01); *H04L 49/90* (2013.01); *H04L 2025/03745* (2013.01)

(58) Field of Classification Search
CPC ............... H04L 25/03114; H04L 49/90; H04L 25/03019; H04L 2025/03745; G06F 13/1673; G06F 13/161; G06F 2213/0042
See application file for complete search history.

(56) References Cited

U.S. PATENT DOCUMENTS

| | | | | |
|---|---|---|---|---|
| 2014/0241411 | A1* | 8/2014 | Ghiasi | H04L 25/4904 375/231 |
| 2015/0043628 | A1* | 2/2015 | Rane | H04L 25/03019 375/232 |
| 2016/0381190 | A1* | 12/2016 | Parnaby | H04L 69/24 709/227 |

(Continued)

*Primary Examiner* — Khanh C Tran
(74) *Attorney, Agent, or Firm* — Law Office of R. Alan Burnett, P.S

(57) ABSTRACT

Methods and apparatus for implementing adaptive equalization channel extension retimer link-up in high-speed serial links. Under aspects of the proposed methodology, the retimer device intervenes with the adaptive equalization training, training both ends of the link individually between the two end points, and once both of the retimer's receivers are trained, it propagates the receiver readiness indication through from one end point to the other. This allows all sections of the link to train at the same time, and for all devices to transition to data mode at the same time, once all channels have been adapted to and trained. This methodology also applies to cascaded retimer device configurations, where multiple retimers are being used to extend the channel even further.

26 Claims, 7 Drawing Sheets

(56) References Cited

U.S. PATENT DOCUMENTS

2017/0017604 A1* 1/2017 Chen .................... G06F 13/4221
2017/0286359 A1* 10/2017 McGowan .......... G06F 13/4291
2018/0285227 A1* 10/2018 Sharma ............... G06F 11/3006
2018/0293198 A1* 10/2018 Vertenten ............ G06F 13/4045

* cited by examiner

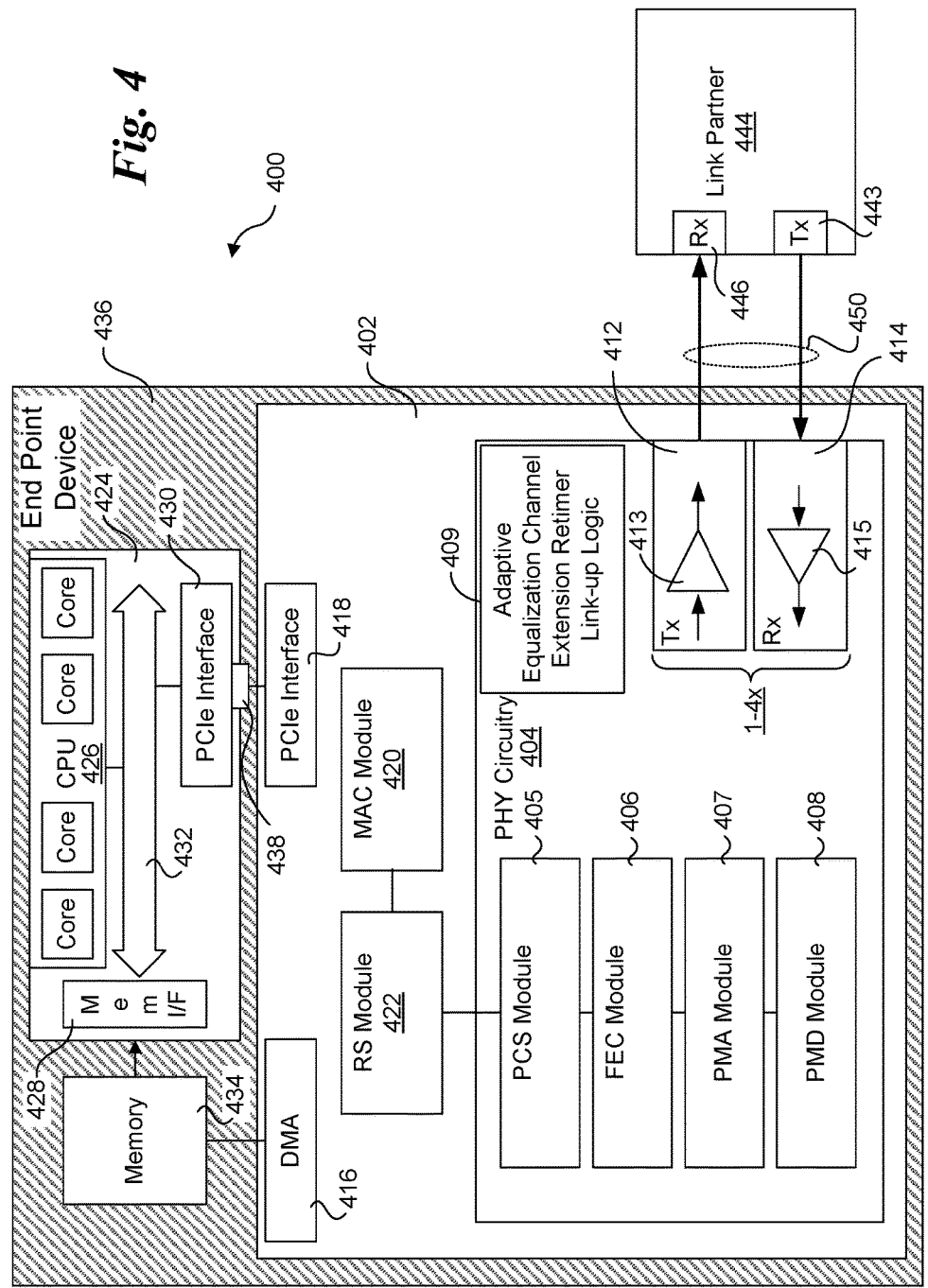

ADAPTIVE EQUALIZATION CHANNEL EXTENSION RETIMER LINK-UP METHODOLOGY

CROSS-REFERENCE TO RELATED APPLICATION

This patent application is a U.S. National Phase Application under 35 U.S.C. Section 371 of International Application No. PCT/US16/45925, filed on Aug. 6, 2016, entitled "ADAPTIVE EQUALIZATION CHANNEL EXTENSION RETIMER LINK-UP METHODOLOGY" which claims benefit of provisional 62/202,078, filed on Aug. 6, 2015 entitled "ADAPTIVE EQUALIZATION CHANNEL EXTENSION RETIMER LINK-UP METHODOLOGY", which is hereby incorporated herein by reference in its entirety and for all purposes.

BACKGROUND INFORMATION

In serial input/output communications, single or multiple retimer device(s) are often used to extend the reach of a communication link. As serial bit data rates increase, challenging signal integrity requirements and complicated protocols lead to a need for more complex buffering (retimer) devices, which in turn require increased levels of configuration. Certain protocols use in-line speed negotiation and equalization link training, and current industry buffering/retiming solutions regularly fail to properly handle this complicated link up flow, especially when devices are cascaded together. Previous industry solutions are not robust or are not compliant with nor defined by the specification.

There currently is no industry specification dictating how these retimer devices should perform their link up process for most protocols using link training. Therefore there is no standard way, and many of the current implementations do not account for some of the intricacies of adaptive equalization link establishment, especially in a cascaded configuration.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4 is a block schematic architecture diagram for an end point device, according to one embodiment;

DETAILED DESCRIPTION

Figure 1:
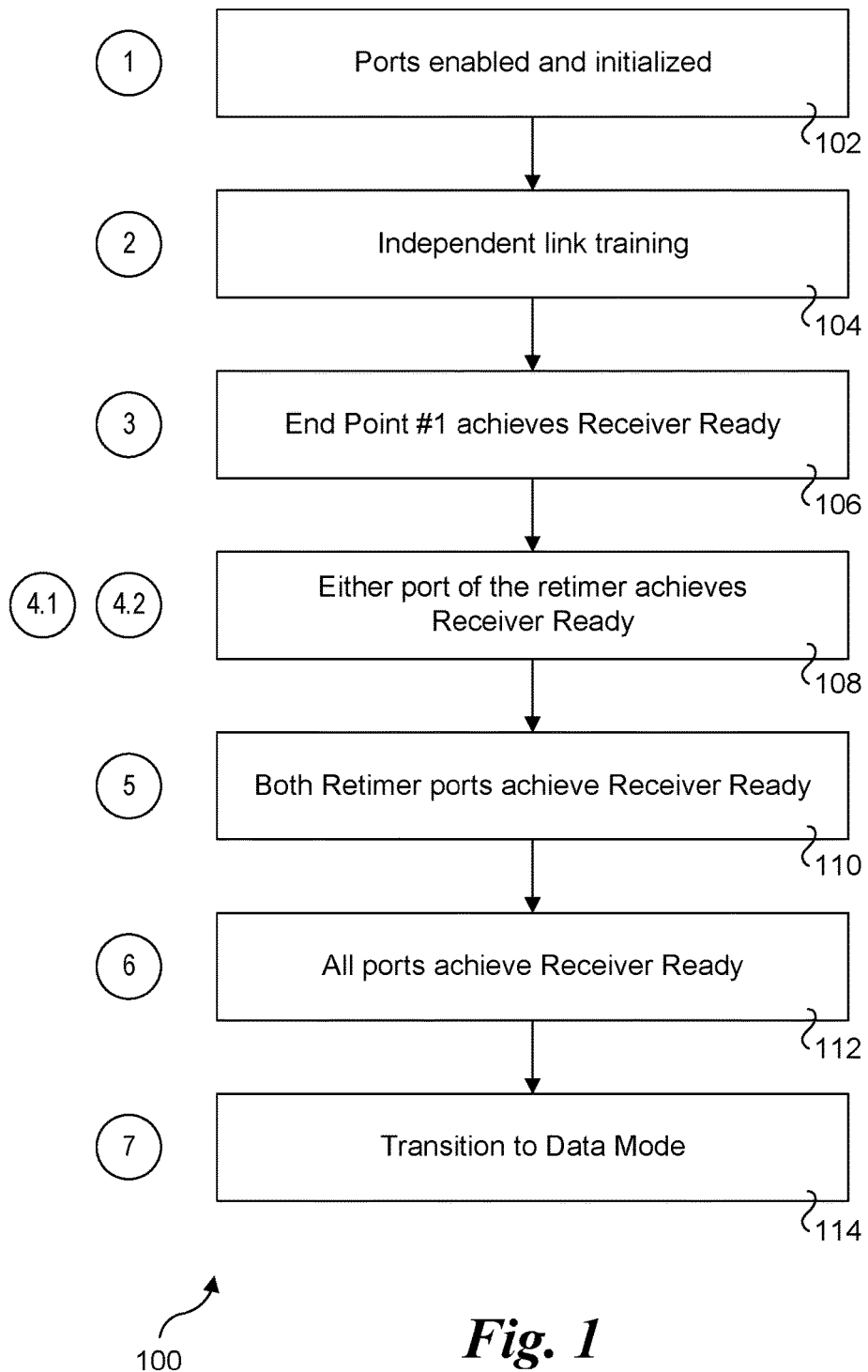
FIG. 1 is a flowchart illustrating operations performed in connection with initializing a link including a retimer device, according to one embodiment.

Embodiments of methods and apparatus for implementing adaptive equalization channel extension retimer link-up are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The following embodiments concern a methodology for protocol aware retimers to extend the channel reach of adaptive equalization protocols beyond the (current) specification and capabilities of the PHY, by splitting the channel and properly tuning each transmitter and receiver to the connected channel. Using the proposed methodology described herein, a retimer with a PMD but no PCS would be invisible to all layers above the PMD, and may be cascaded with multiple channel extension devices.

A basic principle is that a retimer device should intervene with the adaptive equalization training portion of the link up process to extend the maximum channel reach of the adaptive equalization communication interface between two PHYs in a very specific way, to allow maximum robustness and cascading of devices. The retimer device should close off the channel between the two end points, train with each end point individually, and wait to indicate to the end points that its receiver is trained until it has both of its receivers in the path trained. At that time, it should propagate the receiver trained indication.

The following description discloses a method to allow reliable link up between two high speed serial end points using a protocol that utilizes adaptive equalization, when a retimer device is being used to extend the channel length. Exemplary applicable protocols include, but are not limited to IEEE 10GBASE-KR, IEEE 40GBASE-CR4, and PCIe Gen3 (Peripheral Component Interconnect Express, 3$^{rd}$ Generation). Under aspects of the proposed methodology, the retimer device intervenes with the adaptive equalization training, training both ends of the link individually between the two end points, and once both of the retimer's receivers are trained, it propagates the receiver readiness indication through from one end point to the other. This allows both ends of the link to train at the same time, and for all devices to transition from training to data mode at the same time, once all channels have been trained. This methodology also applies to cascaded retimer device configurations, where multiple retimers are being used to extend the channel even further.

By waiting until both retimer ports have trained the local receiver, this assures that the retimer does not indicate that a channel is trained until the retimer is ready to maintain a link on both channels to which it is connected. Once all retimer ports are trained, any receiver readiness indication from a link partner will be propagated through the retimer and eventually reach the far end link partner.

Figure 2A:
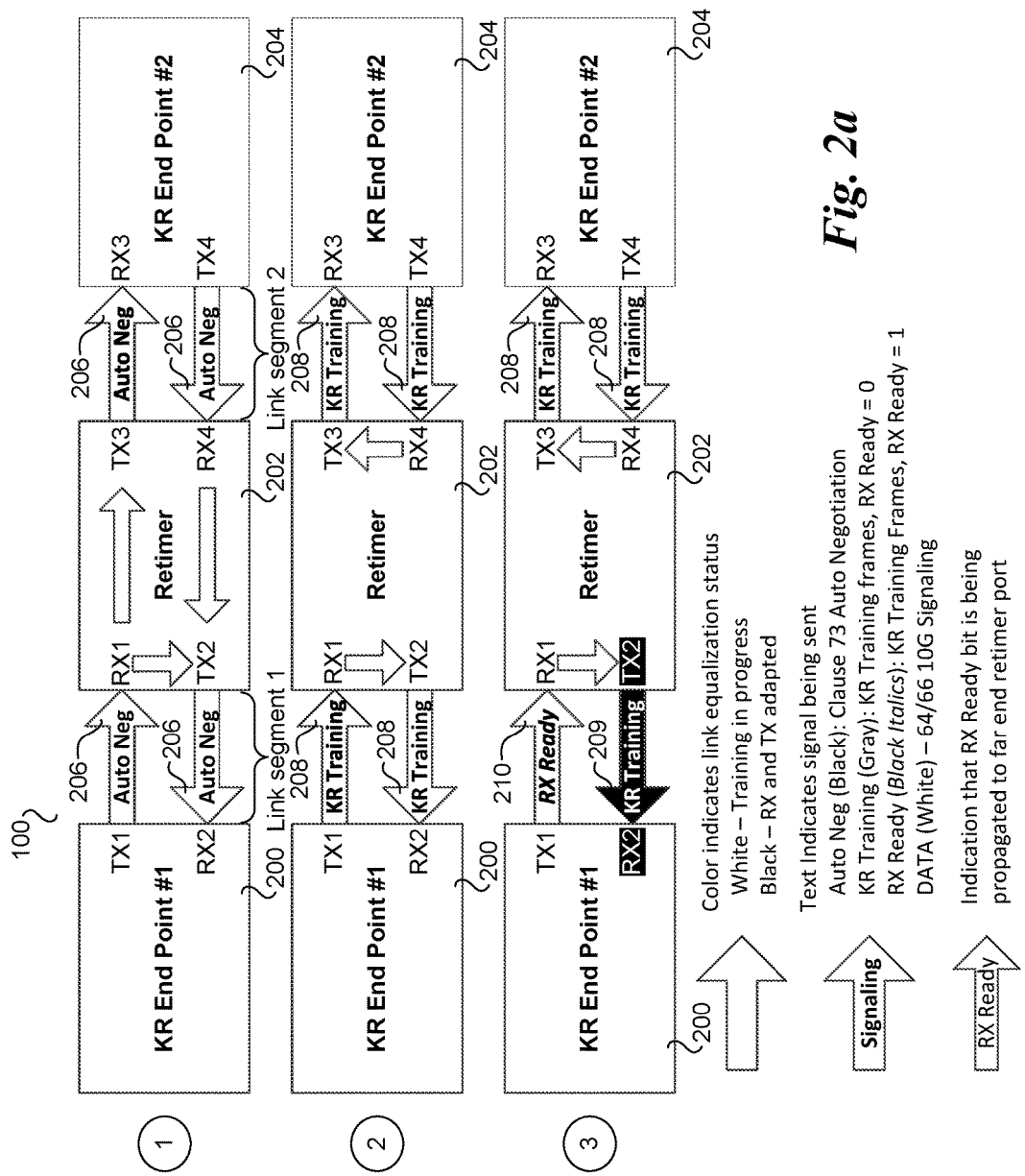
FIGS. 2a-2c collectively comprise a block schematic and message flow diagram illustrating messages that are transferred between first and second end points and a retimer device in accordance with the operations of the flowchart of FIG. 1, according to one embodiment.
Figure 2B:
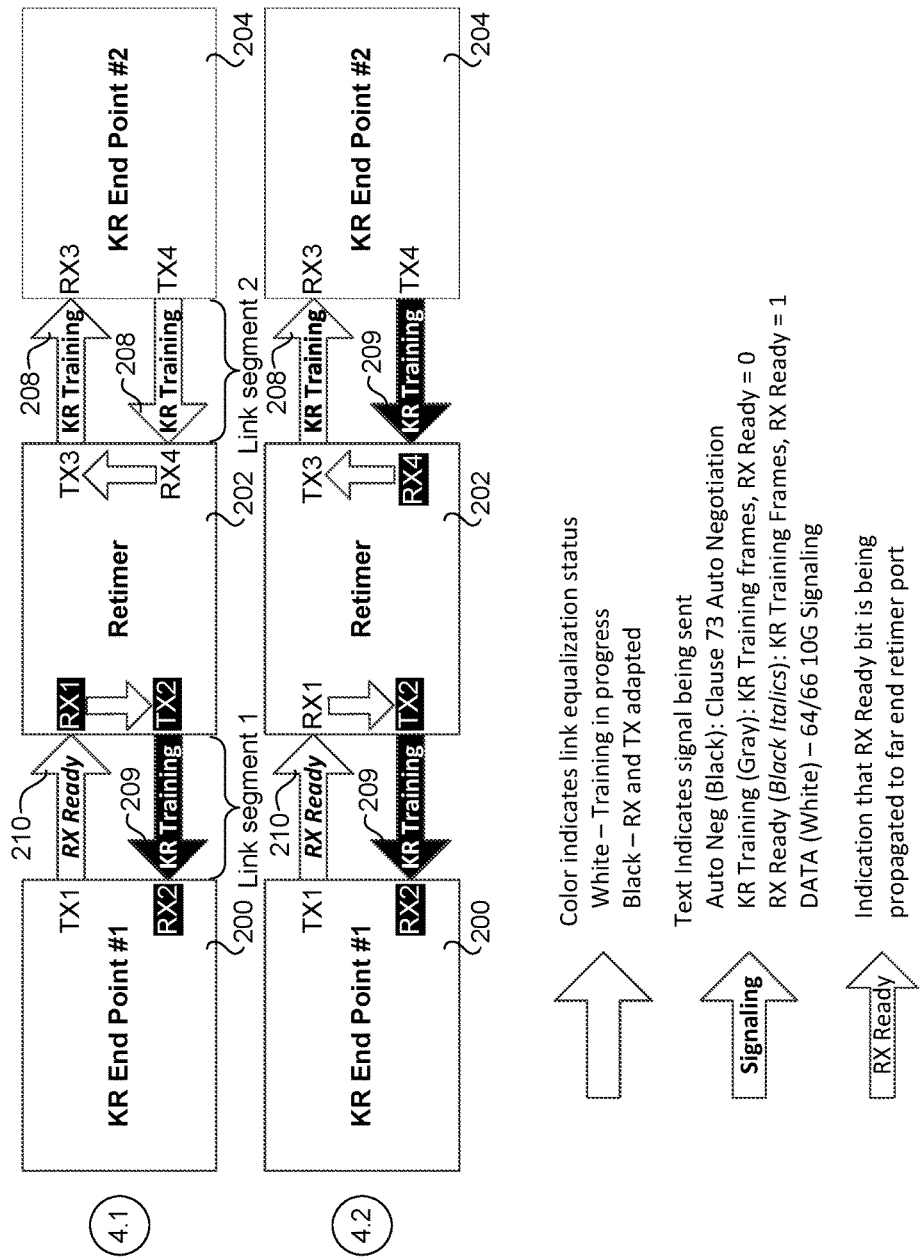
Figure 2C:
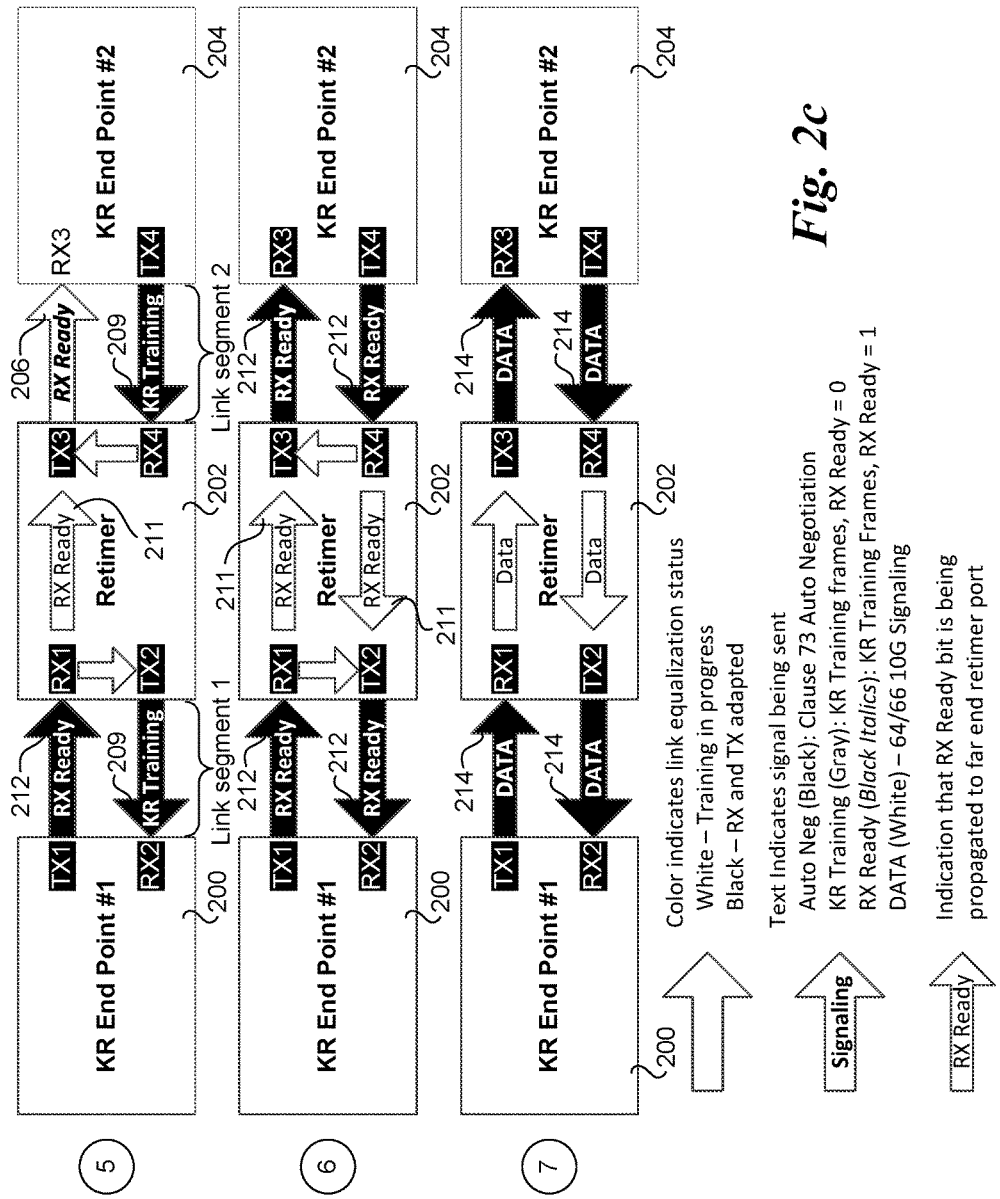

FIGS. 1 and 2a-2c illustrate an example link up flow incorporating this proposed methodology, according to one embodiment. This particular example uses the 10GBASE-KR protocol; however, this is merely exemplary and non-limiting, as similar operations may be applied to other communication protocols. In this exemplary protocol, "Receiver Ready" is the specification defined bit used by the devices to communicate to the other end point that the local receiver is converged and ready to move to data mode. The block and message flow diagrams of FIGS. 2a-2c show the status of all of the Transmitters (TX) and Receivers (RX) in the path, as well as what information is sent on each channel.

FIG. 1 shows a flowchart 100 illustrating operations performed in accordance with one embodiment for adaptive equalization channel extension retimer link-up. Corresponding operations are depicted in FIGS. 2a-2c, wherein the encircled numbers (e.g., 1, 2, etc.) in FIGS. 1 and 2a-2c are used to associate operations in the flowchart with corresponding activities in FIGS. 2a-2c. Each of FIGS. 2a-2c includes a legend indicating what the different color-coding and text color/styles represent.

Each of FIGS. 2a-2c depicts a communication links between a pair of End Points 200 and 204 (also shown and referred to herein as KR End Point #1 and KR End Point #2) that is extended by a Retimer 202. End point 200 includes a transmitter TX1 and a receiver RX2. Retimer 202 includes a pair of transmitters TX2 and TX3 and a pair of receivers RX1 and RX4. End Point 200 includes a receiver RX3 and a transmitter TX4. End Point 200 is coupled to Retimer 202 via a first link segment 1, while Retimer 202 is coupled to End Point 204 via a second link segment 2.

Each of link segments 1 and 2 support bi-directional communication between transmitters and receivers on opposing ends of the link segments on a pairwise transmitter-to-receiver basis. For example transmitter TX1 transmit signals to receiver RX1, transmitter TX2 transmits signals to receiver RX2, etc.

The link up flow process begins in a block 102 corresponding to a first operation under which all of the ports are enabled and initialized. Generally, each of the receivers and transmitters depicted in FIGS. 2a-2c are associated with a port, either on a one-to-one basis or a pairwise basis. For example, a receiver may be associated with a receiver port, or, alternatively, a transmitter and receiver at the same end of a link may be associated with a network or link port. Further explanation of such ports are described below with reference to FIGS. 3 and 4.

The communications link being set up via the link up flow process is between KR End Points 1 and 2, wherein Retimer 202 (also referred to a retimer block or retimer device) extends the physical length of the communication link, which includes link segments 1 and 2. In the illustrated embodiment, link Auto Negotiation (AN) operations are performed in accordance with IEEE 802.3-2012 Clause 73 (Auto Negotiation). During this Auto Negotiation phase of the process, Retimer 202 is configured to pass through signals it receives at its receivers and transmit them out the transmitters on the ports opposites the ports on which the signals are received. (See discussion of FIG. 3 below for details on the port configuration of one embodiment of a Retimer.) As shown by operation 1 in FIG. 2a, Retimer 202 passes through Auto Negotiation signals 206 transmitted from each of End Point 1 and 2 to the other End Point. Generally, the AN operations are used to determine the capabilities of each End Point so that a communication link that supports the capabilities of the two End Points may be configured.

During operation 2 independent link training is performed, as depicted in a block 104 of flowchart 100. As shown in FIG. 2a, KR Training occurs independently on both side of the communication link (i.e., over each of link segments 1 and 2), wherein the link partner (for the purpose of KR training) for each of End Points 1 and 2 is Retimer 202 (as opposed to KR training between End Points that are directly connected over a single link). During this state, each of transmitters TX1, TX2, TX3, and TX4 transmit KR training signals 208.

As shown in a block 106 corresponding to operation 3, End Point 1 has achieved RX Ready status. In further detail, End Point 1's local receiver RX2 has been trained (via training signals transmitted from TX2 on Retimer 202 to RX2 on End Point 1), as indicated by each of RX2 and TX2 depicted in white text with a black background and a KR training signal 209 shown in gray text with a black background. In addition, RX Ready is indicated to Retimer 202 by setting the RX Ready status bit to '1' in an RX Ready signal 210 transmitted from transmitter TX1 to receiver RX1. Meanwhile, the RX Ready signal is not propagated through Retimer 202 because the Retimer ports are not yet converged.

As shown in a block 108 corresponding to operations 4.1 and 4.2, at this stage on of the port of Retimer 202 has achieved RX Ready status (but not both). It doesn't matter which of Retimer 202's ports converges first, as RX Ready is not indicated nor propagated to End Point 2 until both of Retimer 202's ports have converged.

It is noted that under each of the states depicted for operations 4.1 and 4.2, although a receiver on Retimer 202 is ready, a corresponding RX Ready signal is not sent back over the link segment to the End Point that is the link partner for that link segment. For example, during this link training phase, Retimer 202 is a link partner with End Point 1 (using link segment 1), and Retimer 202 also a link partner with End Point 2 using link segment 2. Under a normal link training process, such as defined by various IEEE 802.3-2012 clauses, once a receiver at one end of the link is ready, that end of the link will begin transmitting an RX Ready signal to the other end of the link. However, at this stage the training signal continues to be transmitted instead, even if both receivers of the link partners have been trained and are ready.

During operation 5, both Retimer ports achieve RX Ready status, as shown in a block 110. Subsequently, once it is determined that both Retimer 202's ports have an RX Ready status, Retimer 202 is reconfigured to pass through RX Ready signals, as depicted by an RS Ready signal 211, thus enabling propagation of the RX Ready indication from End Point 1 to End Point 2 to begun. The RX Ready signal 212 shown with white text on a black arrow indicates the training from transmitter TX1 to receiver RX1 for link segment 1 has been completed. It is noted that transmitter TX2 continues to transmit training signals 209 even though receiver RX2 has already been trained.

At the conclusion of operation 6, all ports have achieved RX Ready, as shown in a block 112. At this stage, all ports are trained and ready to transition to data mode. Retimer 202 propagates the RX Ready indication from both End Points 1 and 2, as shown.

Subsequently, transition to data mode occurs, as shown by operation 7. Retimer 202 propagates received data using equalization determined during training, as indicated by DATA signals 214. In one embodiment, the transition to data mode (effected through use of a SEND_DATA signal in the IEEE 802.3-212 standard) is seamless—from the viewpoint of End Points 1 and 2, they are directly connected via a single link segment.

Figure 3:
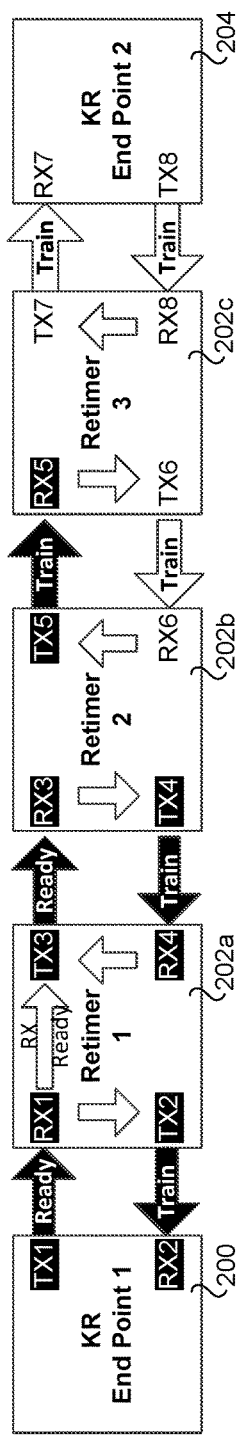
FIG. 3 is a block schematic and message flow diagram illustrating an example of the propagation of Receiver Ready (RX Ready) across a link including a cascaded sequence of three retimer blocks.

The foregoing process can be extended to support communication link including multiple cascaded Retimers interposed between End Points forming a link comprising a serial chain of devices interconnected by link segments. For example, FIG. 3 shows further details of the propagation of Receiver Ready signals across a link including a cascaded sequence of three Retimers 202a, 202b, and 202c. Generally, when a link includes multiple Retimers, the operations of flowchart 100 are performed in a cascaded manner across the link segments, wherein each link segment will include at least one Retimer, and some link segments will include Retimers at both ends. It is noted that there doesn't need to be a specific order of Receiver Readiness, but rather all ports need to have the RX Ready status before transition to data mode can commence. The flow described in this specification ensures that transition to data mode occurs on all devices simultaneously, rendering the presence of a Retimer in the channel path "invisible" to the end point devices.

FIG. 4 shows an architecture for an end point device 400 employing a network chip 402 configured to perform link initialization including adaptive equalization channel extension Retimer link-up operations in accordance with aspects of the embodiments disclosed herein. Network chip 402 comprises PHY (Physical Layer) circuitry 404 including a Physical Coding Sublayer (PCS) module 405, an IEEE Clause 74 Forward Error Correction (FEC) module 406, a Physical Medium Attachment (PMA) module 407, a PMD module 408, adaptive equalization channel extension retimer link-up logic 409, a transmit (Tx) port 412 including transmitter circuitry 413 and a receive (Rx) port 414 including receiver circuitry 415. Depending on the PHY that is implemented, network chip will be configured to employ 1-4 lanes, wherein each lane includes a respective Tx port 412 and Rx port 414. Alternatively, a given port will include 1-4 pairs of transmitters and receivers.

Network chip 402 further includes a DMA (Direct Memory Access) interface 416, a Peripheral Component Interconnect Express (PCIe) interface 418, a MAC (Media Access Channel) module 420 and a Reconciliation Sublayer (RS) module 422. End point device 400 also comprises a computer system 424 including a Central Processing Unit (CPU) 426 having one or more processor cores, coupled to a memory interface 428 and a PCIe interface 430 via an interconnect 432. Memory interface 428 is further depicted as being coupled to memory 434. Under a typical configuration, network chip 402, CPU 424 and memory 434 will be mounted on or otherwise operatively coupled to a circuit board 436 that includes wiring traces for coupling these components in communication, as depicted by single lines connecting DMA 416 to memory 434 and PCIe interface 418 to PCIe interface 430 at a PCIe port 438. As an optional configuration, the components depicted for CPU 424 and network chip 402 may be combined on a computer, a server, a multi-chip module, or a device having similar device packaging.

In one embodiment, MAC module 420 is configured to implement aspects of the MAC layer operations performed that are well-known in the art. Similar, RS module 422 is configured to implement reconciliation sub-layer operations.

During link initialization operations, adaptive equalization channel extension retimer link-up logic 409 is implemented to perform the operations of the end point devices, as depicted in FIGS. 1, 2a-2c and 3, as discussed above. During link initialization and during subsequent data transfer operations, data is exchanged between PHY transmit and receive ports 412 and 414 of end point device 400 and its link partner, as depicted by a link partner 444 including a receiver port 446 and a transmitter port 448 and are linked in communication via an Ethernet link 450. In one embodiment link partner 444 comprises a retimer device having a configuration shown in FIG. 5.

Under various embodiments, network chip 402 comprises one of a 10 Gb/s, 25 Gb/s, 40 Gb/s or 100 Gb/s Ethernet Network Interface Controller (NIC) chip, such as but not limited to an Ethernet NIC employing a 10GBASE-KR PHY, a 40GBASE-CR4 PHY, a 25GBASE-KR PHY, a 25GBASE-CR PHY, a 100GBASE-KR PHY or a 100GBASE-CR PHY as defined by IEEE 802.3-2012. Network chip 402 may also comprise a PCIe network interface, such as a PCIe Gen3 network interface, as well as other existing and future PCIe interfaces. In addition, the circuitry and components of network chip 402 may also be implemented in other types of chips and components, including CPUs, multi-chip modules, and NIC chips including support for multiple network interfaces (e.g., wired and wireless). In addition, other PHYs and associated protocols may be implemented in addition to Ethernet, and PCIe links, such as but not limited to InfiniBand links.

Figure 5:
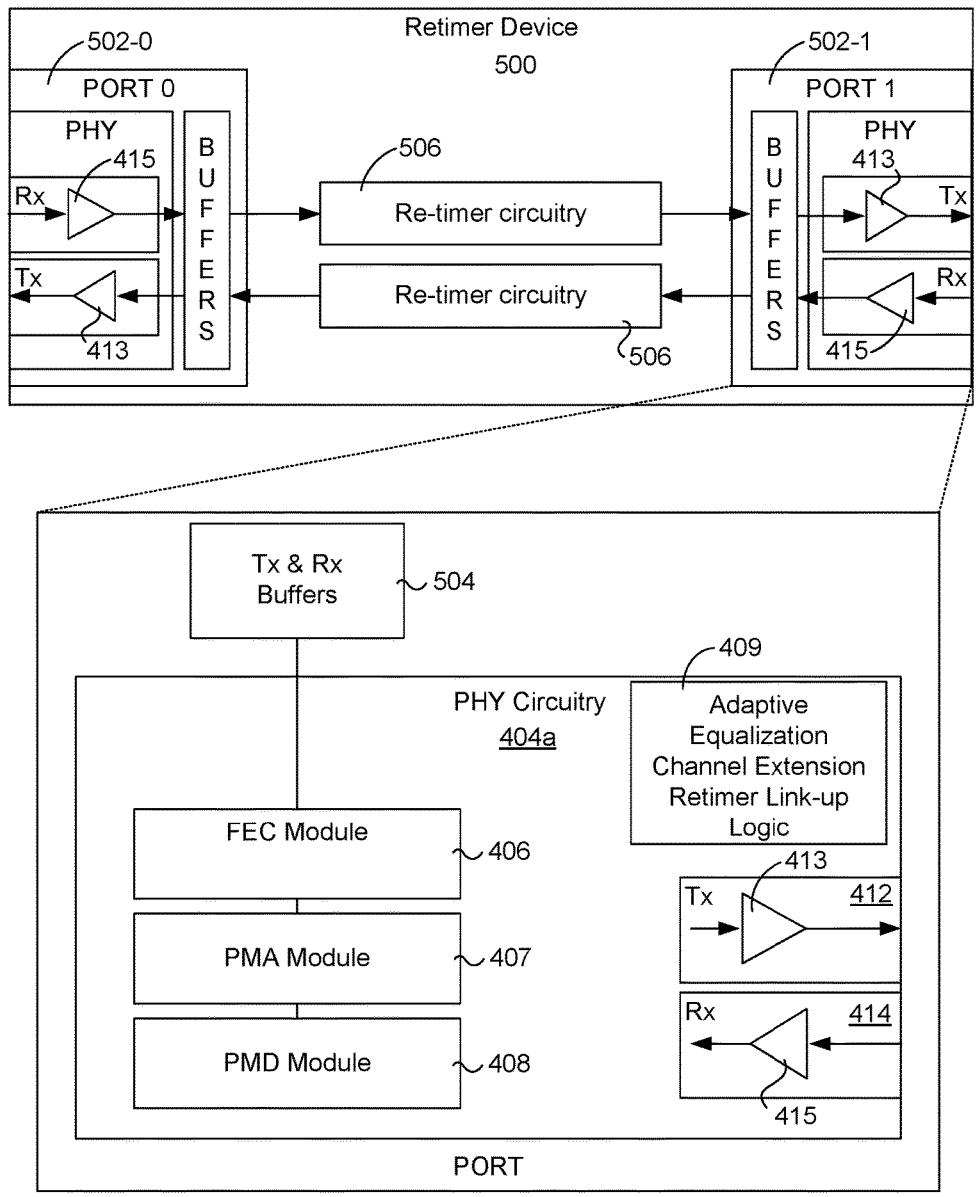
FIG. 5 is a block schematic architecture diagram for a retimer device, according to one embodiment.

FIG. 5 shows an architecture for a retimer device 500 configured to implement aspects of the method operations described herein. Retimer device 500 includes a pair of ports 502-0 and 502-1 (Port 0 and Port 1), each having PHY circuitry 404a similar to that shown in FIG. 4 and described above, except with the PCS module removed. As before, PHY circuitry 404a includes a Tx and Rx ports 412 and 414, each of which is coupled to an Rx port and Tx port of an upstream or downstream device (as applicable). Presuming an ordering from left to right, when implemented in a serial chain, Port 0 is connected to an upstream device, while Port 1 is connected to a downstream device.

A primary function of a retimer (buffer) device is signal re-timing. These functions are performed by re-timer circuitry blocks 506 (one block for each direction), as shown. The particular retimer device circuits will depend on the PHY being used for the link. Generally, retimer circuitry is configured to recover the incoming signal and retransmit using a local clock and new transmit equalization circuitry, and may typically employ well-known circuitry for this purpose, such as phase lock loops. A retimer may further comprise transmitter and receiver circuitry including one or more amplifier circuits, as well as various types of well-known signal-conditioning circuitry used to increase the drive level of a received signal. Such retimer circuitry is well-known to those skilled in the high-speed interconnect arts, and, accordingly, no further details are shown or discussed herein.

Exemplary Communication Link Structures Employing Cascaded Retimers

Figure 6A:
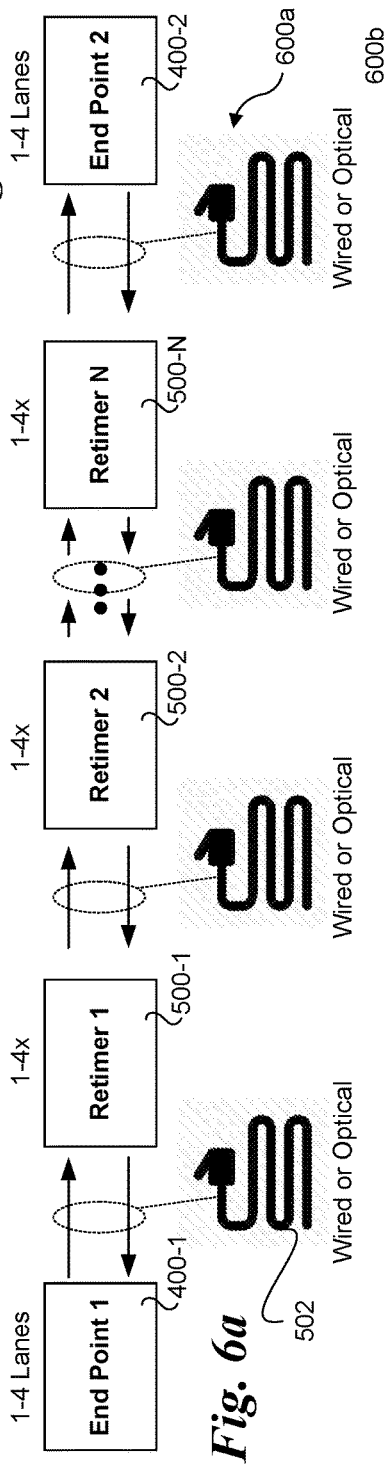
FIG. 6a is a schematic diagram illustrating a communication link between a pair of end point devices using a plurality of cascaded retimers connected via link segments comprising wired or optical cables.
Figure 6B:
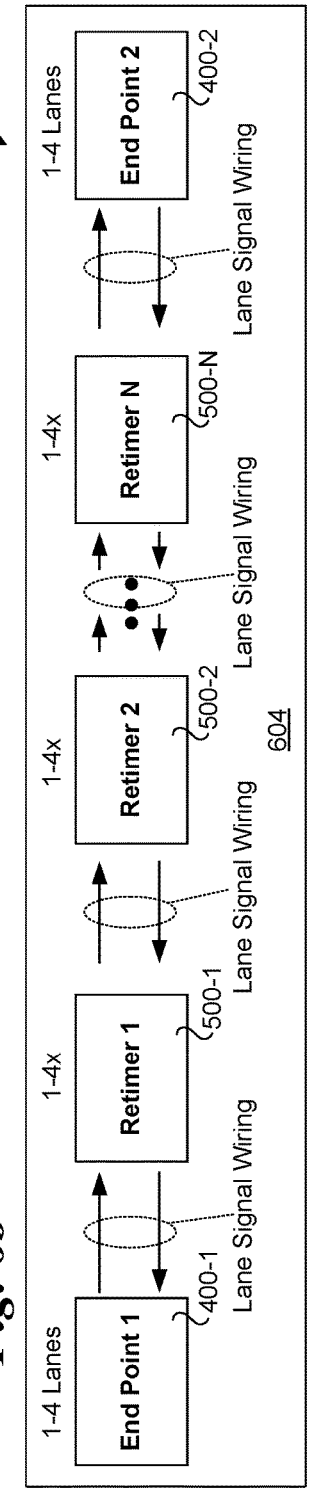
FIG. 6b is a schematic diagram of a communication link between a pair of end point devices mounted on a printed circuit board (PCB) including plurality of cascaded retimers mounted on the PCB.

Examples of communication link structures linking a pair of end points in communication via a plurality of cascaded retimers interspersed along the link are shown in FIGS. 6a and 6b. For example, FIG. 6a shows a communication link 600a coupling a pair of end point devices 402-1 and 402-2 in communication using N cascaded retimer devices 500-1 . . . 500-N connected via link segments comprising wired or optical cables 602. FIG. 6b shows a communication link 600b between a pair of end point devices 402-1 and 402-2 mounted on a printed circuit board (PCB) 604 that includes a N cascaded retimer devices 500-1 . . . 500-N mounted on the PCB.

In the exemplary and non-limiting embodiments of FIGS. 6a and 6b, the communication links are high-speed Ethernet links. Generally, a given high-speed Ethernet link will employ 1-4 lanes in each direction. For example, Ethernet links employing a 10GBASE-KR PHY, a 25GBASE-KR PHY or a 25GBASE-CR PHY use a single lane in each direction, while Ethernet links employing a 40GBASE-CR4 PHY, a 100GBASE-KR PHY or a 100GBASE-CR PHY use four lanes in each direction. For illustrative purposes, communication links 600a and 600b are depicted as employing a single lane in each direction, and will include a corresponding set of conductors or optical pathways when using link segments comprising wired or optical cables 502, or will include applicable signal wiring coupled between each pair of devices when using PCB 604.

Under multi-lane link embodiments, there will be a retimer block for each lane having circuitry similar to that shown for retimer device 500 in FIG. 5 and discussed above. In one embodiment, multiple retimer blocks are implemented on a single retimer device, such as a retimer block supporting a four-lane link including four retimer blocks (not shown). When a multi-lane link is brought up, auto-negotiation operations are performed over a single lane, while line training and subsequent data mode operations are performed for each of the multiple lanes. Generally, when link segments are implemented with wired or optical cables, retimer devices supporting multiple lanes may be connected using one or more cables between pairs of devices.

Further aspects of the subject matter described herein are set out in the following numbered clauses:

1. A method for bringing up a communication link between first and second end points including a first link segment coupling the first end point to a retimer and a second link segment coupling the retimer to the second end point, each of the first and second end points having a transmitter and receiver, the retimer including a first port having a first transmitter and a first receiver and a second port having a second transmitter and a second receiver, the method comprising:

concurrently training each of the first and second receivers of the retimer and the receivers of the first and second end points;

determining that each of the first and second receivers of the retimer have been trained, and in response thereto, configuring the retimer to pass through receiver ready signals to enable a receiver ready signal transmitted by the first or second end point to be received by the receiver of the other end point; and once receiver ready signals have been received by each of the receivers on the first and second end points, transitioning to a data mode to enable data to be transmitted over the communication link between the first end point and the second end point, wherein the data signals are passed through the retimer.

2. The method of clause 1, wherein concurrently training each of the first and second receivers of the retimer and the receivers of the first and second end points comprises:

training the first receiver of the retimer by performing a first training process with the transmitter of the first end point;

training the receiver of the first end point by performing a second training process with the first transmitter of the retimer;

training the second receiver of the retimer performing a third training process with the transmitter of the second end point;

training the receiver of the second end point by performing a fourth training process with the second transmitter of the retimer;

3. The method of clause 2, wherein each of the first, second, third, and fourth training processes comprises an adaptive equalization training process.

4. The method of any of the preceding clauses, wherein training the first receiver of the retimer and training the receiver of the first end point comprises performing link training operations over the first link segment, wherein the first end point and the retimer are link partners, and wherein training the second receiver of the retimer and training the receiver of the second end point comprises performing link training operations over the second link segment, wherein the second end point and the retimer are link partners.

5. The method of any of the preceding clauses, further comprising:

transmitting training signals from the transmitter of the first end point to the first receiver of the retimer and transmitting training signals from the first transmitter of the retimer to the receiver of the first end point;

determining that the first receiver on the retimer has been trained; and continuing transmitting training signals from the first transmitter of the retimer to the receiver of the first end point while the first receiver on the retimer has been trained without transmitting a receiver ready signal to the first end point indicating the first receiver of the retimer is ready.

6. The method of clause 5, further comprising:

determining both the first and second receivers on the retimer have been trained;

while training signals are being received at the second receiver from the second end point, continuing transmitting training signals from the first transmitter of the retimer to the receiver of the first end point;

receiving a receiver ready signal transmitted by the second end point at the second receiver; and passing the receiver ready signal through the retimer and transmitting the receiver ready signal via the first transmitter on the retimer to the receiver on the first end point.

7. The method of any of the preceding clauses, further comprising, prior to concurrently training each of the first and second receivers of the retimer and the receivers of the first and second end points, performing auto negotiation (AN) operations over the communication link under which AN signals are transmitted from the transmitters of each of the first and second end points over the communication link to the receivers of the first and second end points, and wherein the AN signals are passed through the retimer.

8. The method of clause 7, wherein the communication link comprises an Ethernet link, and the AN signals are implemented as part of AN operations defined by IEEE 802.3 Clause 73.

9. The method of any of the preceding clauses, wherein the communication link comprises one of an IEEE 10GBASE-KR link, an IEEE 40GBASE-CR4 link, an IEEE 25GBASE-KR link, an IEEE 25GBASE-CR link, an IEEE 100GBASE-KR link, an IEEE 100GBASE-CR link, and a Peripheral Component Interconnect Express link.

10. A retimer device, comprising:
 a first port having a first transmitter and a first receiver coupled to a first plurality of buffers;
 a second port having a second transmitter and a second receiver coupled to a second plurality of buffers;
 first and second retimer circuitry coupled between the first plurality of buffers and the second plurality of buffers; and
 circuitry and logic that is configured, when that retimer device is implemented in a communication link between first and second end points including a first link segment coupling the first end point to the retimer and a second link segment coupled between the retimer and the second end point, to,
  transmit signals to and receive signals transmitted from the first end point in connection with performing first link training operations over the first link segment, the first link training operations use to train the first receiver of the retimer device and a receiver of the first end point;
  transmit signals to and receive signals transmitted from the second end point in connection with performing second link training operations over the second link segment, the second link training operations use to train the second receiver of the retimer device and a receiver of the second end point;
  determine that each of the first and second receivers of the retimer device have been trained, and in response thereto,
   configuring the retimer device to pass through receiver ready signals to enable receiver ready signals transmitted by the first and second end points to be received by the receiver of the other end point.

11. The retimer device of clause 10, wherein the circuitry and logic is further configured, when that retimer device is implemented in the communication link, to pass through data signals sent between the first and second end points when the communication link is operating in a data mode.

12. The retimer device of clause 10 or 11, wherein each of the first and second link training operations comprises adaptive equalization training processes.

13. The retimer device of any of clauses 10-12, wherein the circuitry and logic is further configured, when that retimer device is implemented in the communication link, to:
 receive, at the first receiver, training signals from the transmitter of the first end point and send training signals from the first transmitter of the retimer to the receiver of the first end point;
  determine that the first receiver has been trained; and
  continue transmitting training signals from the first transmitter to the receiver of the first end point while the first receiver has been trained without transmitting a receiver ready signal to the first end point indicating the first receiver is ready.

14. The retimer device of clause 13, wherein the circuitry and logic is further configured, when that retimer device is implemented in the communication link, to:
 determine both the first and second receivers have been trained;
 while training signals are being received at the second receiver from the second end point,
  continuing to send training signals from the first transmitter to the receiver of the first end point;
  receive, at the second receiver, a receiver ready signal transmitted by the second end point; and
  pass the receiver ready signal through the retimer device and transmit the receiver ready signal via the first transmitter to the receiver on the first end point.

15. The retimer device of any of clauses 10-14, wherein the circuitry and logic is further configured, when that retimer device is implemented in the communication link, to facilitate auto negotiation (AN) operations performed in conjunction with bringing up the communication link by passing through AN signals transmitted over the link between the first and second end points.

16. The retimer device of clause 15, wherein the communication link comprises an Ethernet link, and the AN signals are implemented as part of AN operations defined by IEEE 802.3 Clause 73.

17. The retimer device of clause 15, wherein the communication link comprises one of an IEEE 10GBASE-KR link, an IEEE 40GBASE-CR4 link, an IEEE 25GBASE-KR link, an IEEE 25GBASE-CR link, an IEEE 100GBASE-KR link, an IEEE 100GBASE-CR link, and a Peripheral Component Interconnect Express link.

18. A system comprising:
 first and second end points, each end point including,
  a transmitter; and
  a receiver;
 a retimer, including,
  a first port having a first transmitter and a first receiver coupled to a first plurality of buffers;
  a second port having a second transmitter and a second receiver coupled to a second plurality of buffers; and
  first and second retimer circuitry coupled between the first plurality of buffers and the second plurality of buffers;
 a first link segment, respectively coupling the transmitter and receiver of the first end point device to the first receiver and first transmitter of the retimer;
 a second link segment, respectively coupling the transmitter and receiver of the second end point device to the second receiver and second transmitter of the retimer;
 wherein the first and second end points are linked in communication over a communication link comprising the first and second link segments and the retimer, and wherein the first and second end points and the retimer are configured to perform operations to bring up the communication link including,
  concurrently training each of the first and second receivers of the retimer and the receivers of the first and second end points;
  determining that each of the first and second receivers of the retimer have been trained, and in response thereto,
   configuring the retimer to pass through receiver ready signals to enable receiver ready signals transmitted by the first and second end points to be received by the receiver of the other end point; and once receiver ready signals have been received by each of the receivers on the first and second end points, transitioning to a data mode to enable data to be transmitted over the communication link, wherein the data signals are passed through the retimer.

19. The system of clause 18, wherein training the first receiver of the retimer and training the receiver of the first end point comprises performing link training operations over the first link segment, wherein the first end point and the retimer are link partners, and wherein training the second receiver of the retimer and training the receiver of the second end point comprises performing link training operations over the second link segment, wherein the second end point and the retimer are link partners.

20. The system of clause 18 or 19, wherein the first and second end points and the retimer are configured to perform further operations to bring up the communication link including:
transmitting training signals from the transmitter of the first end point to the first receiver of the retimer and transmitting training signals from the first transmitter of the retimer to the receiver of the first end point;
determining that the first receiver on the retimer has been trained; and
continuing transmitting training signals from the first transmitter of the retimer to the receiver of the first end point while the first receiver on the retimer has been trained without transmitting a receiver ready signal to the first end point indicating the first receiver of the retimer is ready.

21. The system of clause 20, wherein the first and second end points and the retimer are configured to perform further operations to bring up the communication link including:
determining both the first and second receivers on the retimer have been trained;
while training signals are being received at the second receiver from the second end point,
continuing transmitting training signals from the first transmitter of the retimer to the receiver of the first end point;
receiving a receiver ready signal transmitted by the second end point at the second receiver; and
passing the receiver ready signal through the retimer and transmitting the receiver ready signal via the first transmitter on the retimer to the receiver on the first end point.

22. The system of any of clauses 18-21, wherein the first and second end points and the retimer are configured to perform further operations to bring up the communication link including:
prior to concurrently training each of the first and second receivers of the retimer and the receivers of the first and second end points, performing auto negotiation (AN) operations over the communication link under which AN signals are transmitted from the transmitters of each of the first and second end points over the communication link to the receivers of the first and second end points, and wherein the AN signals are passed through the retimer.

23. The system of clause 22, wherein the communication link comprises an Ethernet link, and the AN signals are implemented as part of AN operations defined by IEEE 802.3 Clause 73.

24. The system of any of clauses 18-23, wherein the communication link comprises one of an IEEE 10GBASE-KR link, an IEEE 40GBASE-CR4 link, an IEEE 25GBASE-KR link, an IEEE 25GBASE-CR link, an IEEE 100GBASE-KR link, an IEEE 100GBASE-CR link, and a Peripheral Component Interconnect Express link.

25. The system of any of clauses 18-24, wherein concurrently training each of the first and second receivers of the retimer and the receivers of the first and second end points comprises:
training the first receiver of the retimer by performing a first training process with the transmitter of the first end point;
training the receiver of the first end point by performing a second training process with the first transmitter of the retimer;
training the second receiver of the retimer performing a third training process with the transmitter of the second end point;
training the receiver of the second end point by performing a fourth training process with the second transmitter of the retimer;

26. The system of any of clauses 18-25, wherein each of the first, second, third, and fourth training processes comprises an adaptive equalization training process.

27. The system of any of clauses 18-25, wherein each of the first and second link segments comprise one of wired or optical cables.

28. The system of clause 25, wherein each of the first and second end points and the retimer comprise components mounted to a printed circuit board (PCB) and the first and second link segments respectively comprise a first set of wiring in the PCB connecting the first end point to the retimer and a second set of wiring in the PCB connecting the retimer to the second end point.

29. A method for bringing up a communication link between first and second end points including a plurality of cascaded retimers interposed along the communication link and interconnected via a plurality of link segments, each of the first and second end points having a transmitter and receiver, each retimer including a first port having a first transmitter and a first receiver and a second port having a second transmitter and a second receiver, the method comprising:
concurrently training each of the first and second receivers of each of the plurality of retimers and the receivers of the first and second end points;
for each of the retimers,
determining that each of the first and second receivers of the retimer have been trained, and in response thereto, configuring the retimer to pass through receiver ready signals to enable a receiver ready signal received at a receiver of one of the first and second ports to be passed through the retimer and be transmitted out of the transmitter of the other port,
otherwise preventing receiver ready signals from passing through the retimer until each of the first and second receivers of the retimer have been trained.

30. The method of clause 29, wherein the plurality of cascaded retimers are cascaded in a sequence beginning with a first retimer and ending with a last retimer, further comprising:
in response to the receiver on the first end point being ready, transmitting a receiver ready signal from the transmitter of the first end point over a first link segment coupling the first end point in communication with the first retimer;
in response to the receiver on the second end point being ready, transmitting a receiver ready signal from the transmitter of the second end point over a last link segment coupling the second end point in communication with the last retimer,
once both the first and second receivers on each of the plurality of cascaded retimers have been trained, passing receiver ready signals through each of the retimers such that receiver ready signals transmitted from the transmitter of the first end point are received by the receiver of the second end point, and receiver ready signals transmitted from the transmitter of the second end point are received at the receiver of the first end point; and transitioning the communication link to a data mode to enable data signals to be transmitted over the communication link between the first end point and the second end point, wherein the data signals are passed through each of the plurality of cascaded retimers.

32. The method of clause 30 or 31, further comprising:

prior to concurrently training each of the first and second receivers of the each of the plurality of cascaded retimers and the receivers of the first and second end points, performing auto negotiation (AN) operations over the communication link under which AN signals are transmitted from the transmitters of each of the first and second end points over the communication link to the receivers of the first and second end points, and wherein the AN signals are passed through each of the plurality of cascaded retimers.

33. The method of clause 32, wherein the communication link comprises an Ethernet link, and the AN signals are implemented as part of AN operations defined by IEEE 802.3 Clause 73.

34. The system of any of clauses 29-33, wherein concurrently training each of the first and second receivers of each of the plurality of retimers and the receivers of the first and second end points comprises performing a respective adaptive equalization training process.

35. The method of any of clauses 29-34, wherein the first endpoint is coupled to a first retimer via a first link segment, further comprising:

transmitting training signals via the first link segment from the transmitter of the first end point to the first receiver of the first retimer and transmitting training signals via the first link segment from the first transmitter of the first retimer to the receiver of the first end point;

determining that the first receiver on the first retimer has been trained; and continuing transmitting training signals from the first transmitter of the first retimer to the receiver of the first end point while the first receiver on the first retimer has been trained without transmitting a receiver ready signal to the first end point indicating the first receiver of the first retimer is ready.

36. The method of clause 35, further comprising:

determining both the first and second receivers on the first retimer have been trained;

while training signals are being received at the second receiver of the first retimer from a second retimer coupled to the first retimer via a second link segment, continuing transmitting training signals from the first transmitter of the first retimer to the receiver of the first end point;

receiving a receiver ready signal transmitted by the second retimer at the second receiver of the first retimer; and passing the receiver ready signal through the first retimer and transmitting the receiver ready signal via the first transmitter on the first retimer to the receiver on the first end point.

37. The method of any of clauses 29-36, wherein the communication link comprises one of an IEEE 10GBASE-KR link, an IEEE 40GBASE-CR4 link, an IEEE 25GBASE-KR link, an IEEE 25GBASE-CR link, an IEEE 100GBASE-KR link, an IEEE 100GBASE-CR link, and a Peripheral Component Interconnect Express link.

38. A system comprising:
first and second end points, each end point including,
a transmitter; and
a receiver;
a plurality of retimers, each including,
a first port having a first transmitter and a first receiver coupled to a first plurality of buffers;
a second port having a second transmitter and a second receiver coupled to a second plurality of buffers; and
first and second retimer circuitry coupled between the first plurality of buffers and the second plurality of buffers; and
a plurality of link segments, each coupling one of an end point in communication with a retimer or a pair of retimers in communication,
wherein the first and second end points are linked in communication over a communication link comprising the plurality of link segments and the plurality of retimers, which are interposed along the communication link in a cascaded manner, and wherein the first and second end points and the plurality of retimers are configured to perform operations to bring up the communication link including,
concurrently training each of the first and second receivers of each of the plurality of retimers and the receivers of the first and second end points;
for each of the retimers,
determining that each of the first and second receivers of the retimer have been trained, and in response thereto, configuring the retimer to pass through receiver ready signals to enable a receiver ready signal received at a receiver of one of the first and second ports to be passed through the retimer and be transmitted out of the transmitter of the other port,
otherwise preventing receiver ready signals from passing through the retimer until each of the first and second receivers of the retimer have been trained.

39. The system of clause 38, wherein the plurality of retimers are cascaded in a sequence beginning with a first retimer and ending with a last retimer, and wherein the first and second end points and the plurality of retimers are configured to perform further operations to bring up the communication link comprising:

in response to the receiver on the first end point being ready, transmitting a receiver ready signal from the transmitter of the first end point over a first link segment coupling the first end point in communication with the first retimer;

in response to the receiver on the second end point being ready, transmitting a receiver ready signal from the transmitter of the second end point over a last link segment coupling the second end point in communication with the last retimer, once both the first and second receivers on each of the plurality of retimers have been trained, passing receiver ready signals through each of the retimers such that receiver ready signals transmitted from the transmitter of the first end point are received by the receiver of the second end point, and receiver ready signals transmitted from the transmitter of the second end point are received at the receiver of the first end point; and transitioning the communication link to a data mode to enable data signals to be transmitted over the communication link between the first end point and the second end point, wherein the data signals are passed through each of the plurality of retimers.

40. The system of clause 38 or 39, wherein the first and second end points and the plurality of retimers are configured to perform further operations to bring up the communication link comprising:

prior to concurrently training each of the first and second receivers of the each of the plurality of cascaded retimers and the receivers of the first and second end points, performing auto negotiation (AN) operations over the communication link under which AN signals are transmitted from the transmitters of each of the first and second end points over the communication link to the receivers of the first and second end points, and wherein the AN signals are passed through each of the plurality of cascaded retimers.

41. The system of clause 40, wherein the communication link comprises an Ethernet link, and the AN signals are implemented as part of AN operations defined by IEEE 802.3 Clause 73.

42. The system of any of clauses 38-41, wherein concurrently training each of the first and second receivers of each of the plurality of retimers and the receivers of the first and second end points comprises performing a respective adaptive equalization training process.

43. The system of any of clauses 38-42, wherein the first endpoint is coupled to a first retimer via a first link segment, and wherein the first and second end points and the plurality of retimers are configured to perform further operations to bring up the communication link comprising:

transmitting training signals via the first link segment from the transmitter of the first end point to the first receiver of the first retimer and transmitting training signals via the first link segment from the first transmitter of the first retimer to the receiver of the first end point;

determining that the first receiver on the first retimer has been trained; and continuing transmitting training signals from the first transmitter of the first retimer to the receiver of the first end point while the first receiver on the first retimer has been trained without transmitting a receiver ready signal to the first end point indicating the first receiver of the first retimer is ready.

44. The system of clause 43, wherein the first and second end points and the plurality of retimers are configured to perform further operations to bring up the communication link comprising:

determining both the first and second receivers on the first retimer have been trained;

while training signals are being received at the second receiver of the first retimer from a second retimer coupled to the first retimer via a second link segment, continuing transmitting training signals from the first transmitter of the first retimer to the receiver of the first end point;

receiving a receiver ready signal transmitted by the second retimer at the second receiver of the first retimer; and passing the receiver ready signal through the first retimer and transmitting the receiver ready signal via the first transmitter on the first retimer to the receiver on the first end point.

45. The method of any of clauses 38-44, wherein the communication link comprises one of an IEEE 10GBASE-KR link, an IEEE 40GBASE-CR4 link, an IEEE 25GBASE-KR link, an IEEE 25GBASE-CR link, an IEEE 100GBASE-KR link, an IEEE 100GBASE-CR link, and a Peripheral Component Interconnect Express link.

46. The system of any of clauses 38-45, wherein each of the first and second link segments comprise one of wired or optical cables.

47. The system of any of clauses 38-45, wherein each of the first and second end points and each of the plurality of retimers comprise components mounted to a printed circuit board (PCB) and the plurality of link segments respectively comprise a sets of wiring in the PCB interconnecting the components.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for bringing up a communication link between first and second end points including a first link segment coupling the first end point to a retimer and a second link segment coupled between the retimer and the second end point, each of the first and second end points having a transmitter and receiver, the retimer including a first port having a first transmitter and a first receiver and a second port having a second transmitter and a second receiver, the method comprising:

concurrently training each of the first and second receivers of the retimer and the receivers of the first and second end points;

determining that each of the first and second receivers of the retimer have been trained, and in response thereto, configuring the retimer to pass through receiver ready signals to enable a receiver ready signal transmitted by the first or second end point to be received by the receiver of the other end point; and once receiver ready signals have been received by each of the receivers on the first and second end points, transitioning to a data mode to enable data to be transmitted over the communication link between the first end point and the second end point, wherein the data signals are passed through the retimer.

2. The method of claim 1, wherein concurrently training each of the first and second receivers of the retimer and the receivers of the first and second end points comprises:

training the first receiver of the retimer by performing a first training process with the transmitter of the first end point;

training the receiver of the first end point by performing a second training process with the first transmitter of the retimer;

training the second receiver of the retimer performing a third training process with the transmitter of the second end point;

training the receiver of the second end point by performing a fourth training process with the second transmitter of the retimer.

3. The method of claim 2, wherein each of the first, second, third, and fourth training processes comprises an adaptive equalization training process.

4. The method of claim 1, wherein training the first receiver of the retimer and training the receiver of the first end point comprises performing link training operations over the first link segment, wherein the first end point and the retimer are link partners, and wherein training the second receiver of the retimer and training the receiver of the second end point comprises performing link training operations over the second link segment, wherein the second end point and the retimer are link partners.

5. The method of claim 1, further comprising:

transmitting training signals from the transmitter of the first end point to the first receiver of the retimer and transmitting training signals from the first transmitter of the retimer to the receiver of the first end point;

determining that the first receiver on the retimer has been trained; and continuing transmitting training signals from the first transmitter of the retimer to the receiver of the first end point while the first receiver on the retimer has been trained without transmitting a receiver ready signal to the first end point indicating the first receiver of the retimer is ready.

6. The method of claim 5, further comprising:

determining both the first and second receivers on the retimer have been trained;

while training signals are being received at the second receiver from the second end point, continuing transmitting training signals from the first transmitter of the retimer to the receiver of the first end point;

receiving a receiver ready signal transmitted by the second end point at the second receiver; and passing the receiver ready signal through the retimer and transmitting the receiver ready signal via the first transmitter on the retimer to the receiver on the first end point.

7. The method of claim 1, further comprising, prior to concurrently training each of the first and second receivers of the retimer and the receivers of the first and second end points, performing auto negotiation (AN) operations over the communication link under which AN signals are transmitted from the transmitters of each of the first and second end points over the communication link to the receivers of the first and second end points, and wherein the AN signals are passed through the retimer.

8. The method of claim 7, wherein the communication link comprises an Ethernet link, and the AN signals are implemented as part of AN operations defined by IEEE 802.3 Clause 73.

9. The method of claim 1, wherein the communication link comprises one of an IEEE 10GBASE-KR link, an IEEE 40GBASE-CR4 link, an IEEE 25GBASE-KR link, an IEEE 25GBASE-CR link, an IEEE 100GBASE-KR link, and an IEEE 100GBASE-CR link.

10. The method of claim 1, wherein the communication link comprises a Peripheral Component Interconnect Express link.

11. A retimer device, comprising:
a first port having a first transmitter and a first receiver coupled to a first plurality of buffers;
a second port having a second transmitter and a second receiver coupled to a second plurality of buffers;
first and second retimer circuitry coupled between the first plurality of buffers and the second plurality of buffers; and
circuitry and logic that is configured, when that retimer device is implemented in a communication link between first and second end points including a first link segment coupling the first end point to the retimer and a second link segment coupled between the retimer and the second end point, to,
transmit signals to and receive signals transmitted from the first end point in connection with performing first link training operations over the first link segment, the first link training operations use to train the first receiver of the retimer device and a receiver of the first end point;
transmit signals to and receive signals transmitted from the second end point in connection with performing second link training operations over the second link segment, the second link training operations use to train the second receiver of the retimer device and a receiver of the second end point;
determine that each of the first and second receivers of the retimer device have been trained, and in response thereto,
configuring the retimer device to pass through receiver ready signals to enable receiver ready signals transmitted by the first and second end points to be received by the receiver of the other end point.

12. The retimer device of claim 11, wherein the circuitry and logic is further configured, when that retimer device is implemented in the communication link, to pass through data signals sent between the first and second end points when the communication link is operating in a data mode.

13. The retimer device of claim 11, wherein each of the first and second link training operations comprises adaptive equalization training processes.

14. The retimer device of claim 11, wherein the circuitry and logic is further configured, when that retimer device is implemented in the communication link, to:
receive, at the first receiver, training signals from the transmitter of the first end point and send training signals from the first transmitter of the retimer to the receiver of the first end point;
determine that the first receiver has been trained; and
continue transmitting training signals from the first transmitter to the receiver of the first end point while the first receiver has been trained without transmitting a receiver ready signal to the first end point indicating the first receiver is ready.

15. The retimer device of claim 14, wherein the circuitry and logic is further configured, when that retimer device is implemented in the communication link, to:
determine both the first and second receivers have been trained;
while training signals are being received at the second receiver from the second end point,
continuing to send training signals from the first transmitter to the receiver of the first end point;
receive, at the second receiver, a receiver ready signal transmitted by the second end point; and
pass the receiver ready signal through the retimer device and transmit the receiver ready signal via the first transmitter to the receiver on the first end point.

16. The retimer device of claim 11, wherein the circuitry and logic is further configured, when that retimer device is implemented in the communication link, to facilitate auto negotiation (AN) operations performed in conjunction with bringing up the communication link by passing through AN signals transmitted over the link between the first and second end points.

17. The retimer device of claim 16, wherein the communication link comprises an Ethernet link, and the AN signals are implemented as part of AN operations defined by IEEE 802.3 Clause 73.

18. The retimer device of claim 16, wherein the communication link comprises one of an IEEE 10GBASE-KR link, an IEEE 40GBASE-CR4 link, an IEEE 25GBASE-KR link, an IEEE 25GBASE-CR link, an IEEE 100GBASE-KR link, an IEEE 100GBASE-CR link, and a Peripheral Component Interconnect Express link.

19. A system comprising:
first and second end points, each end point including,
a transmitter; and
a receiver;
a retimer, including,
a first port having a first transmitter and a first receiver coupled to a first plurality of buffers;
a second port having a second transmitter and a second receiver coupled to a second plurality of buffers; and
first and second retimer circuitry coupled between the first plurality of buffers and the second plurality of buffers;
a first link segment, respectively coupling the transmitter and receiver of the first end point device to the first receiver and first transmitter of the retimer;
a second link segment, respectively coupling the transmitter and receiver of the second end point device to the second receiver and second transmitter of the retimer;
wherein the first and second end points are linked in communication over a communication link comprising the first and second link segments and the retimer, and wherein the first and second end points and the retimer are configured to perform operations to bring up the communication link including,
concurrently training each of the first and second receivers of the retimer and the receivers of the first and second end points;
determining that each of the first and second receivers of the retimer have been trained, and in response thereto, configuring the retimer to pass through receiver ready signals to enable receiver ready signals transmitted by the first and second end points to be received by the receiver of the other end point; and
once receiver ready signals have been received by each of the receivers on the first and second end points, transitioning to a data mode to enable data to be transmitted over the communication link, wherein the data signals are passed through the retimer.

20. The system of claim 19, wherein training the first receiver of the retimer and training the receiver of the first end point comprises performing link training operations over the first link segment, wherein the first end point and the retimer are link partners, and wherein training the second receiver of the retimer and training the receiver of the second end point comprises performing link training operations over the second link segment, wherein the second end point and the retimer are link partners.

21. The system of claim 19, wherein the first and second end points and the retimer are configured to perform further operations to bring up the communication link including:
transmitting training signals from the transmitter of the first end point to the first receiver of the retimer and transmitting training signals from the first transmitter of the retimer to the receiver of the first end point;
determining that the first receiver on the retimer has been trained; and
continuing transmitting training signals from the first transmitter of the retimer to the receiver of the first end point while the first receiver on the retimer has been trained without transmitting a receiver ready signal to the first end point indicating the first receiver of the retimer is ready.

22. The system of claim 21, wherein the first and second end points and the retimer are configured to perform further operations to bring up the communication link including:
determining both the first and second receivers on the retimer have been trained;
while training signals are being received at the second receiver from the second end point,
continuing transmitting training signals from the first transmitter of the retimer to the receiver of the first end point;
receiving a receiver ready signal transmitted by the second end point at the second receiver; and
passing the receiver ready signal through the retimer and transmitting the receiver ready signal via the first transmitter on the retimer to the receiver on the first end point.

23. The system of claim 19, wherein the first and second end points and the retimer are configured to perform further operations to bring up the communication link including:
prior to concurrently training each of the first and second receivers of the retimer and the receivers of the first and second end points, performing auto negotiation (AN) operations over the communication link under which AN signals are transmitted from the transmitters of each of the first and second end points over the communication link to the receivers of the first and second end points, and wherein the AN signals are passed through the retimer.

24. A method for bringing up a communication link between first and second end points including a plurality of cascaded retimers interposed along the communication link and interconnected via a plurality of link segments, each of the first and second end points having a transmitter and receiver, each retimer including a first port having a first transmitter and a first receiver and a second port having a second transmitter and a second receiver, the method comprising:
concurrently training each of the first and second receivers of each of the plurality of retimers and the receivers of the first and second end points;
for each of the retimers,
determining that each of the first and second receivers of the retimer have been trained, and in response thereto,
configuring the retimer to pass through receiver ready signals to enable a receiver ready signal received at a receiver of one of the first and second ports to be passed through the retimer and be transmitted out of the transmitter of the other port,
otherwise preventing receiver ready signals from passing through the retimer until each of the first and second receivers of the retimer have been trained.

25. The method of claim 24, wherein the plurality of cascaded retimers are cascaded in a sequence beginning with a first retimer and ending with a last retimer, further comprising:
in response to the receiver on the first end point being ready, transmitting a receiver ready signal from the transmitter of the first end point over a first link segment coupling the first end point in communication with the first retimer;
in response to the receiver on the second end point being ready, transmitting a receiver ready signal from the transmitter of the second end point over a last link segment coupling the second end point in communication with the last retimer,
once both the first and second receivers on each of the plurality of cascaded retimers have been trained, passing receiver ready signals through each of the retimers such that receiver ready signals transmitted from the transmitter of the first end point are received by the receiver of the second end point, and receiver ready signals transmitted from the transmitter of the second end point are received at the receiver of the first end point; and
transitioning the communication link to a data mode to enable data signals to be transmitted over the communication link between the first end point and the second end point, wherein the data signals are passed through each of the plurality of cascaded retimers.

26. The method of claim 24, further comprising:
prior to concurrently training each of the first and second receivers of the each of the plurality of cascaded retimers and the receivers of the first and second end points, performing auto negotiation (AN) operations over the communication link under which AN signals are transmitted from the transmitters of each of the first and second end points over the communication link to the receivers of the first and second end points, and wherein the AN signals are passed through each of the plurality of cascaded retimers.

* * * * *